Patented Mar. 4, 1941

2,233,701

UNITED STATES PATENT OFFICE 2,233,701

REFRACTORY COMPOSITION FOR DENTAL MOLDS

Cornell Joel Grossman, Millburn, N. J.

No Drawing. Application July 8, 1940,
Serial No. 344,436

4 Claims. (Cl. 22—188)

This invention relates to a composition of materials suitable for use in the manufacture of molds for cast metal and more particularly for use in the forming of molds for cast metallic dentures.

In the manufacture of cast metallic dentures, it is customary to first form a pattern comprised of wax or similar material on which refractory materials are molded. The pattern then is removed and the mold dried, pre-heated and the molten metal is cast into the pre-heated mold preferably by centrifugal casting. It is essential that the mold material employed be adapted to form a substantially smooth surface over the pattern surface and substantially free from expansion and contraction on heating and cooling to obtain accurate dimensioned castings and moreover must be substantially non-reactive with the molten metal cast therein.

One of the objects of the present invention is to provide a composition of materials suitable for such exacting use. Another object is to provide an improved mold material for use in the manufacture of cast metallic dentures. Still another object is to provide an improved bonding agent for refractory material.

In accordance with these objects, I have discovered that of all the refractory materials heretofore proposed as mold materials in the forming of metallic dentures, silica, preferably electrically fused silica, ground to pass 20 mesh with 20—40% thereof passing 200 mesh, is the most suitable for the purpose. This material is chemically inert towards most molten metal compositions and has the property of expanding on heating which in the case of forming cast metallic dentures is advantageous due to the fact that the mold is usually formed within a metal frame and the expansion of the silica within the frame operates to more securely anchor the same therein without material alteration of the dimensions of the intricate pattern of the mold.

The difficulty attending the use of silica as a mold material is in the bonding of the same at atmospheric and elevated temperatures into a strong substantially non-porous mass. I have solved this difficulty by employing a bonding agent consisting of a hydrochloric acid solution of zirconium-magnesium-silicate incorporating in the silica at least sufficient magnesium oxide to effectively neutralize the free hydrochloric acid of the said solution.

By this combination of materials, I obtain a low temperature bonding agent ($MgCl_2$) for giving strength to the silica in the as cast condition and a high temperature bonding agent (Zr-Mg-silicate) operates to bond together the molded silica particles and to densify the same.

The acid solution of Zr-Mg-silicate is best prepared by saturating an acid zirconium oxychloride solution with magnesium silicate. The magnesium oxide (MgO) added to the pre-ground fused silica is preferably freshly precipitated oxide.

As one specific embodiment of the practice of the present invention, silica of the maximum density, preferably electrically fused silica is first ground to pass 20 mesh screen and 20–40% of the same is ground to pass 200 mesh, a size commonly known in the art as "flour size." To this silica is added freshly precipitated magnesium oxide (MgO) in such an amount approximating 2% as will be at least sufficient to effectively neutralize substantially all hydrochloric acid present in the zirconium-magnesium-silicate solution next employed as a plasticizing medium.

In the forming of the zirconium-magnesium-silicate solution of zirconium oxychloride (Baumé 1.38) and add thereto water soluble magnesium silicate (magnesium trisilicate) until a faint precipitate is obtained. Usually one-half pint of the oxychloride solution will dissolve about one ounce of the magnesium silicate before a precipitation will be obtained. The precise proportion of oxychloride to silicate in the solution may be widely varied without departure from the present invention as one skilled in the art will recognize inasmuch as the oxychloride alone, on being thermally decomposed, breaks down into chlorine and $ZrO_2$ which latter oxide is a recognized refractory material. However, for best results I have found it most desirable to effect substantially complete decomposition of the oxychloride and its conversion into the double silicate compound in the plasticizing solution inasmuch as the chlorine content of the oxychloride is then converted into low boiling hydrochloric acid which if not completely neutralized by the magnesium oxide present in the silica will be subsequently driven off during the early drying stages and before the density of the mold offers resistance to its volatilization.

In the forming of dental molds relatively small amounts of the refractory are employed at a time, usually from ¼ to ½ pound of material. A sufficient amount, usually about 20–25 c. c. of the zirconium-magnesium-silicate solution is added to the silica-MgO refractory material and thoroughly mixed therewith until a plastic mass of the desired consistency is obtained. This plastic mass is then poured into the mold over the pattern present therein and is vibrated into position to effectively eliminate all bubbles and to work the same into all the cracks and crevices of the pattern and is allowed to set.

Setting is accomplished by the magnesium chloride formed by reaction of the magnesium oxide present with the free hydrochloric acid in the solution. By varying the amount of magnesium oxide or the amount of acid or both various setting times may be obtained, as one skilled in the art will perceive.

After the cast refractory has set, the mold is carefully dried at between 200-500° F. for a prolonged time interval to thoroughly remove the excess moisture and gases, such as free acid, and then is slowly heated to a temperature approximating the casting temperature of the metal to be cast therein and thereafter is slowly cooled to the desired preheat temperature found most suitable to maintain the fluidity of the particular metal for a time interval during centrifugal casting permitting the same to flow into the intricate portions of the pattern.

Having hereinabove described the present invention generically and specifically and given one specific embodiment of the practice of the same, it is believed apparent that the same may be widely varied without essential departure therefrom and all such variations are contemplated as may fall within the scope of the following claims.

What I claim is:

1. The method of forming a mold for casting metallic dentures which comprises mixing high density silica ground to pass about 20 mesh with 20-40% thereof passing 200 mesh with about 2% magnesium oxide, forming the mixture into a plastic mass with a solution containing free hydrochloric acid, zirconium oxychloride and magnesium trisilicate, casting the mass around a pattern, drying the cast mass and then heating to an elevated temperature approximating the casting temperature of the metal to be cast therein.

2. The method of forming a mold for casting metallic dentures which comprises forming high density silica ground to pass about 20 mesh with 20-40% thereof passing 200 mesh into a plastic mass with water and at least sufficient magnesium chloride to provide a low temperature cementing bond and at least sufficient water soluble zirconium-magnesium-trisilicate to form a high temperature cementing bond, casting the mixture about a pattern and after setting heating the same first at low temperatures to dehydrate the mold and then at high temperatures to obtain said high temperature cementing bond prior to the casting of molten metal therein.

3. The method of forming a mold for casting metallic dentures which comprises forming a plastic mass containing fused silica of a particle size passing about 20 mesh into 20-40% thereof passing about 200 mesh and containing magnesium chloride in an amount at least sufficient to provide a low temperature cementing bond and water soluble zirconium-magnesium-trisilicate in an amount at least sufficient to provide a high temperature cementing bond, casting the plastic mass about a pattern, vibrating the same onto said pattern surface, and after the mass has been consolidated by said low temperature cementing bond drying the mass and slowly heating the same to a temperature at least sufficient to obtain consolidation of the mass by said high temperature cementing bond and thereafter slowly cooling the same to the temperature desired as a mold pre-heat temperature before casting the molten metal therein.

4. A mold comprising a solution of zirconium oxychloride, magnesium trisilicate, magnesium oxide and silica in combination with each other.

CORNELL JOEL GROSSMAN.